United States Patent
Nakaya (10) Patent No.: US 9,043,819 B2
(45) Date of Patent: May 26, 2015

(54) BROADCASTING RECEIVER AND PARENTAL CONTROL SYSTEM

(71) Applicant: Funai Electric Co., Ltd, Daito-shi, Osaka (JP)

(72) Inventor: Hiroyuki Nakaya, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 13/949,618

(22) Filed: Jul. 24, 2013

(65) Prior Publication Data

US 2014/0068655 A1  Mar. 6, 2014

(30) Foreign Application Priority Data

Sep. 3, 2012  (JP) ................... 2012-193512

(51) Int. Cl.
| | |
|---|---|
| H04H 60/56 | (2008.01) |
| H04N 7/16 | (2011.01) |
| H04N 21/454 | (2011.01) |
| G06F 21/32 | (2013.01) |
| H04N 21/4415 | (2011.01) |
| H04N 21/45 | (2011.01) |
| H04N 21/475 | (2011.01) |
| H04N 21/41 | (2011.01) |
| H04N 21/422 | (2011.01) |

(52) U.S. Cl.
CPC ............ *H04N 21/4542* (2013.01); *G06F 21/32* (2013.01); *H04N 21/4415* (2013.01); *H04N 21/4524* (2013.01); *H04N 21/4532* (2013.01); *H04N 21/4751* (2013.01); *H04N 21/4753* (2013.01); *H04N 21/4126* (2013.01); *H04N 21/42201* (2013.01); *H04N 21/42202* (2013.01)

(58) Field of Classification Search
CPC ....................................... H04N 7/163
USPC ................................ 725/10, 25, 12
See application file for complete search history.

(56) References Cited

U.S. PATENT DOCUMENTS

| | | | |
|---|---|---|---|
| 5,751,335 A | 5/1998 | Shintani | |
| 6,025,869 A * | 2/2000 | Stas et al. | ............ 725/28 |
| 7,367,040 B2 | 4/2008 | Yamauchi | |
| 8,046,789 B2 | 10/2011 | Furutani et al. | |
| 2004/0078806 A1 | 4/2004 | Johnson et al. | |

(Continued)

FOREIGN PATENT DOCUMENTS

| | | |
|---|---|---|
| EP | 1 134 972 A2 | 9/2001 |
| JP | 2000-115725 A | 4/2000 |
| JP | 2001-268462 A | 9/2001 |
| JP | 2003-69978 A | 3/2003 |

(Continued)

OTHER PUBLICATIONS

European Search Report dated Dec. 20, 2013 (fifteen (15) pages).

*Primary Examiner* — Nathan Flynn
*Assistant Examiner* — Sumaiya A Chowdhury
(74) *Attorney, Agent, or Firm* — Crowell & Moring LLP (57) ABSTRACT

This broadcasting receiver includes a receiving portion receiving a broadcast signal, a determination portion determining whether or not a user to be subject to parental control of the broadcast signal has entered a prescribed range, and a control portion performing control of enabling parental control corresponding to a user determined to have entered the prescribed range in the case where the parental control corresponding to the user determined to have entered the prescribed range is disabled when the determination portion determines that the user to be subject to parental control has entered the prescribed range.

14 Claims, 7 Drawing Sheets

(56) References Cited

U.S. PATENT DOCUMENTS

| | | | |
|---|---|---|---|
| 2007/0033607 A1* | 2/2007 | Bryan | 725/10 |
| 2010/0015956 A1 | 1/2010 | Qu et al. | |
| 2010/0146536 A1 | 6/2010 | Craner et al. | |
| 2011/0072452 A1* | 3/2011 | Shimy et al. | 725/25 |

FOREIGN PATENT DOCUMENTS

| | | |
|---|---|---|
| JP | 3564698 B2 | 9/2004 |
| JP | 4175396 B2 | 11/2008 |
| JP | 2010-74272 A | 4/2010 |
| JP | 4880189 B2 | 2/2013 |

* cited by examiner

| RATING | RATING SET VALUE |
|---|---|
| 1 | Off |
| 2 | 10 YEARS OLD |
| 3 | 12 YEARS OLD |
| 4 | 16 YEARS OLD |
| 5 | 18 YEARS OLD |

PARENTAL CONTROL TABLE (FIRST EMBODIMENT)

| TIME ZONE | 0:00 -4:00 | 4:00 -8:00 | 8:00 -11:00 | 11:00 -14:00 | 14:00 -17:00 | 17:00 -20:00 | 20:00 -24:00 | RATING SET VALUE | GPS FUNCTION |
|---|---|---|---|---|---|---|---|---|---|
| FIRST USER (PORTABLE TELEPHONE 400a) | Off | Off | On | On | On | On | Off | 10 YEARS OLD | On |
| SECOND USER (PORTABLE TELEPHONE 400b) | Off | Off | Off | On | On | Off | On | 18 YEARS OLD | Off |
| ENABLE SET VALUE | Off | Off | 10 YEARS OLD | 10 YEARS OLD | 10 YEARS OLD | 10 YEARS OLD | 18 YEARS OLD | — | — |

FIG.6
FLOW OF PROCESSING FOR AUTOMATICALLY CHANGING ENABLE SET VALUE

*FIG.7*

PARENTAL CONTROL TABLE (SECOND EMBODIMENT)

| | | RATING SET VALUE | GPS FUNCTION |
|---|---|---|---|
| FIRST USER (PORTABLE TELEPHONE 400a) | Off | 10 YEARS OLD | On |
| SECOND USER (PORTABLE TELEPHONE 400b) | On | 18 YEARS OLD | Off |
| ENABLE SET VALUE | 18 YEARS OLD | – | – |

BROADCASTING RECEIVER AND PARENTAL CONTROL SYSTEM

BACKGROUND OF THE INVENTION

1. Field of the Invention

The present invention relates to a broadcasting receiver and a parental control system, and more particularly, it relates to a broadcasting receiver and a parental control system each having a parental control function.

2. Description of the Background Art

A broadcasting receiver having a parental control function is known in general, as disclosed in Japanese Patent No. 4175396.

Japanese Patent No. 4175396 discloses a broadcasting receiver including a tuner (a receiving portion) receiving a broadcast signal and a control portion performing control of switching between rating levels of parental control (parental control levels) on the basis of a previously set setting table. This control portion of the broadcasting receiver is configured to switch between the rating levels according to time zones set in the setting table.

However, in the broadcasting receiver according to Japanese Patent No. 4175396, a rating level (a parental control level) is uniformly switched according to a prescribed time zone set in the setting table, and hence regardless of the fact that a user to be subject to parental control is in a viewable range, a rating level not corresponding to the user to be subject to parental control may be set on the basis of the setting table. In this case, a parent or the like must manually change the rating level in order to set proper parental control.

SUMMARY OF THE INVENTION

The present invention has been proposed in order to solve the aforementioned problem, and an object of the present invention is to provide a broadcasting receiver and a parental control system each capable of properly performing parental control without the user's operation.

A broadcasting receiver according to a first aspect of the present invention includes a receiving portion receiving a broadcast signal, a determination portion determining whether or not a user to be subject to parental control of the broadcast signal has entered a prescribed range, and a control portion performing control of enabling parental control corresponding to a user determined to have entered the prescribed range in the case where the parental control corresponding to the user determined to have entered the prescribed range is disabled when the determination portion determines that the user to be subject to parental control has entered the prescribed range.

As hereinabove described, the broadcasting receiver according to the first aspect of the present invention is provided with the control portion performing control of enabling the parental control corresponding to the user determined to have entered the prescribed range in the case where the parental control corresponding to the user determined to have entered the prescribed range is disabled when the determination portion determines that the user to be subject to parental control of the broadcast signal has entered the prescribed range, whereby the parental control corresponding to the user determined to have entered the prescribed range automatically becomes enabled when the user to be subject to parental control of the broadcast signal is determined to have entered the prescribed range, and hence parental control can be properly performed without the user's operation.

In the aforementioned broadcasting receiver according to the first aspect, the control portion is preferably configured to perform control of enabling the parental control of parental control information in which the parental control is set for each time period in the case where the parental control of the parental control information in which the parental control is set for each time period is set to be disabled when the determination portion determines that the user to be subject to parental control has entered the prescribed range. According to this structure, in the case of employing the parental control information, the parental control corresponding to the user determined to have entered the prescribed range automatically becomes enabled even when the user to be subject to parental control has entered the prescribed range in a time zone in which the parental control is set to be disabled, and hence parental control can be easily properly performed without the user's operation also in the case of employing the parental control information.

In the aforementioned broadcasting receiver according to the first aspect, the determination portion is preferably configured to determine whether or not the user to be subject to parental control has entered the prescribed range on the basis of the positional information of the user to be subject to parental control. According to this structure, the broadcasting receiver can accurately determine whether or not the user to be subject to parental control has entered the prescribed range, using the positional information of the user to be subject to parental control.

In this case, the determination portion is preferably configured to determine whether or not the user to be subject to parental control has entered the prescribed range on the basis of the positional information of the user to be subject to parental control acquired by an external device with GPS. According to this structure, the broadcasting receiver can more accurately determine whether or not the user to be subject to parental control has entered the prescribed range, using the positional information of the user to be subject to parental control acquired with the GPS.

In the aforementioned structure of determining whether or not the user to be subject to parental control has entered the prescribed range on the basis of the positional information of the user to be subject to parental control acquired with the GPS, the determination portion is preferably configured to determine whether or not the user to be subject to parental control has entered the prescribed range on the basis of the positional information of the user to be subject to parental control that the external device acquires by detecting a portable terminal having a GPS function, carried by the user to be subject to parental control. According to this structure, the broadcasting receiver can more accurately determine whether or not the user to be subject to parental control has entered the prescribed range, using the positional information of the portable terminal having the GPS function, carried by the user.

The aforementioned broadcasting receiver according to the first aspect preferably further includes a storage portion storing individual parental control of each of a plurality of users to be subject to parental control, and the control portion is preferably configured to perform control of enabling the individual parental control in the case where the individual parental control is set to be disabled and reflecting individual parental control of a user under stricter parental control of the individual parental control set to be enabled, when the determination portion determines that the user to be subject to parental control has entered the prescribed range. According to this structure, the individual parental control of the user (a younger user) under stricter parental control is preferentially reflected when there are the plurality of users to be subject to parental control, and hence parental control can be properly performed on the user under stricter parental control without the user's operation.

In the aforementioned broadcasting receiver according to the first aspect, the control portion is preferably configured to perform control of enabling the parental control corresponding to the user determined to have entered the prescribed range and starting to record a program based on the broadcast signal, when the determination portion determines that the user to be subject to parental control has entered the prescribed range in the case where another user views the program. According to this structure, when the user to be subject to parental control enters the prescribed range, whereby the parental control becomes enabled and viewing of the program is interrupted, the interrupted program starts to be recorded. Therefore, another user not to be subject to parental control can view the interrupted program later while parental control is properly performed on the user to be subject to parental control.

In the aforementioned broadcasting receiver according to the first aspect, the control portion is preferably configured to perform control of setting a viewing prevention password for the program to be recorded when the determination portion determines that the user to be subject to parental control has entered the prescribed range in the case where another user views the program based on the broadcast signal and the program starts to be recorded. According to this structure, the user to be subject to parental control can be inhibited from viewing the program recorded when the user to be subject to parental control has entered the prescribed range.

In the aforementioned broadcasting receiver according to the first aspect, the control portion is preferably configured to perform control of disabling parental control corresponding to a user determined to have exited the prescribed range when the determination portion determines that the user to be subject to parental control has exited the prescribed range after determining that the user to be subject to parental control has entered the prescribed range. According to this structure, even in the case where the user to be subject to parental control has entered the prescribed range, whereby the parental control has become enabled, the parental control automatically becomes disabled when the user to be subject to parental control exits the prescribed range and the parental control is no longer required. Therefore, unnecessary parental control on another user not to be subject to parental control can be inhibited without the user's operation.

In the aforementioned broadcasting receiver according to the first aspect, the control portion is preferably configured to perform control of enabling the parental control corresponding to the user determined to have entered the prescribed range when the determination portion determines that the user to be subject to parental control has entered the prescribed range on the basis of the positional information or personal identification information of the user to be subject to parental control. According to this structure, the broadcasting receiver can easily determine that the user to be subject to parental control of the broadcast signal has entered the prescribed range on the basis of the positional information or personal identification information of the user to be subject to parental control, and hence the parental control corresponding to the user determined to have entered the prescribed range can be easily automatically enabled.

In the aforementioned broadcasting receiver according to the first aspect, the control portion is preferably configured to be capable of switching between the on-state and off-state of a determination function for the user to be subject to parental control and perform control of enabling the parental control corresponding to the user determined to have entered the prescribed range when the determination portion determines that the user to be subject to parental control has entered the prescribed range in the case where the determination function is in the on-state. According to this structure, whether or not to automatically enable the parental control can be set by switching between the on-state and off-state of the determination function for the user on the basis of the user's arbitrary setting.

In the aforementioned broadcasting receiver according to the first aspect, the control portion is preferably configured to perform control of cancelling the parental control set to be enabled when the determination portion determines that the user to be subject to parental control has entered the prescribed range upon the user's input of a cancel code previously set by another user. According to this structure, the parental control set to be enabled can be disabled with the cancel code, and hence the convenience can be improved.

In the aforementioned broadcasting receiver according to the first aspect, the control portion is preferably configured to perform control of enabling parental control corresponding to a user determined to have entered the premises of the user as the prescribed range in the case where the parental control corresponding to the user determined to have entered the premises of the user as the prescribed range is disabled when the determination portion determines that the user to be subject to parental control has entered the premises. According to this structure, the parental control can be enabled when the user to be subject to parental control can view the program, and hence parental control can be properly enabled.

In the aforementioned structure in which the parental control of the parental control information is enabled, the parental control information is preferably stored in association with the age of the user to be subject to parental control, and the control portion is preferably configured to perform control of updating the parental control information to correspond to the increased age when the age of the user to be subject to parental control is increased. According to this structure, the parental control information is automatically set to parental control appropriate for the age of the user to be subject to parental control, and hence the trouble of updating the parental control can be avoided when the age of the user is increased.

In the aforementioned structure of determining whether or not the user to be subject to parental control has entered the prescribed range by detecting the portable terminal having the GPS function, the determination portion is preferably configured to determine whether or not a plurality of users to be subject to parental control of the broadcast signal have entered the prescribed range on the basis of the positional information of the plurality of users to be subject to parental control that the external device acquires by detecting portable terminals carried by the plurality of users to be subject to parental control. According to this structure, the broadcasting receiver can accurately determine whether or not the users to be subject to parental control have entered the prescribed range, using the positional information of the portable terminals carried by the plurality of users even when there are the plurality of users to be subject to parental control.

A parental control system according to a second aspect of the present invention includes a positional information acquisition portion acquiring the positional information of a user and a broadcasting receiver including a receiving portion receiving a broadcast signal, a determination portion determining whether or not a user to be subject to parental control of the broadcast signal has entered a prescribed range on the basis of the positional information of the user acquired by the positional information acquisition portion, and a control portion, while the control portion is configured to perform control of enabling parental control corresponding to a user determined to have entered the prescribed range in the case where the parental control corresponding to the user determined to have entered the prescribed range is disabled when the determination portion determines that the user to be subject to the parental control has entered the prescribed range.

As hereinabove described, the parental control system according to the second aspect of the present invention is provided with the control portion performing control of enabling the parental control corresponding to the user determined to have entered the prescribed range in the case where the parental control corresponding to the user determined to have entered the prescribed range is disabled when the determination portion determines that the user to be subject to parental control of the broadcast signal has entered the prescribed range, whereby the parental control corresponding to the user determined to have entered the prescribed range automatically becomes enabled when the user to be subject to parental control of the broadcast signal is determined to have entered the prescribed range, and hence parental control can be properly performed without the user's operation.

In the aforementioned parental control system according to the second aspect, the control portion is preferably configured to perform control of enabling the parental control of parental control information in which the parental control is set for each time period in the case where the parental control of the parental control information in which the parental control is set for each time period is set to be disabled when the determination portion determines that the user to be subject to parental control has entered the prescribed range. According to this structure, in the case of employing the parental control information, the parental control corresponding to the user determined to have entered the prescribed range automatically becomes enabled even when the user to be subject to parental control has entered the prescribed range in a time zone in which the parental control is set to be disabled, and hence parental control can be easily properly performed without the user's operation also in the case of employing the parental control information.

In the aforementioned parental control system according to the second aspect, the positional information acquisition portion is preferably constituted by a portable terminal carried by the user and a server as an external device, and the determination portion is preferably configured to determine whether or not the user to be subject to parental control of the broadcast signal has entered the prescribed range on the basis of the positional information of the portable terminal of the user acquired by the server, transmitted to the broadcasting receiver. According to this structure, the parental control system can accurately determine whether or not the user to be subject to parental control has entered the prescribed range, using the positional information of the portable terminal of the user to be subject to parental control acquired by the server, transmitted to the broadcasting receiver.

In this case, the determination portion is preferably configured to determine whether or not the user to be subject to parental control of the broadcast signal has entered the prescribed range on the basis of the positional information of the portable terminal of the user acquired by the server with GPS, transmitted to the broadcasting receiver. According to this structure, the parental control system can accurately determine whether or not the user to be subject to parental control has entered the prescribed range, using the positional information of the portable terminal of the user to be subject to parental control acquired by the server with the GPS, transmitted to the broadcasting receiver.

In the aforementioned structure of determining whether or not the user to be subject to parental control of the broadcast signal has entered the prescribed range on the basis of the positional information of the portable terminal of the user acquired by the server with the GPS, transmitted to the broadcasting receiver, the parental control system preferably further includes a storage portion storing individual parental control of each of a plurality of users to be subject to parental control, and the control portion is preferably configured to perform control of enabling the individual parental control in the case where the individual parental control is set to be disabled and reflecting individual parental control of a user under stricter parental control of the individual parental control set to be enabled, when the determination portion determines that the user to be subject to parental control has entered the prescribed range. According to this structure, the individual parental control of the user (a younger user) under stricter parental control is preferentially reflected when there are the plurality of users to be subject to parental control, and hence parental control can be properly performed on the user under stricter parental control without the user's operation.

According to the present invention, as hereinabove described, parental control can be properly performed without the user's operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

(First Embodiment)

The structure of a BD (Blu-ray disc) player 100 according to a first embodiment of the present invention is now described with reference to FIGS. 1 to 5. The BD player 100 is an example of the "broadcasting receiver" in the present invention.

Figure 1:
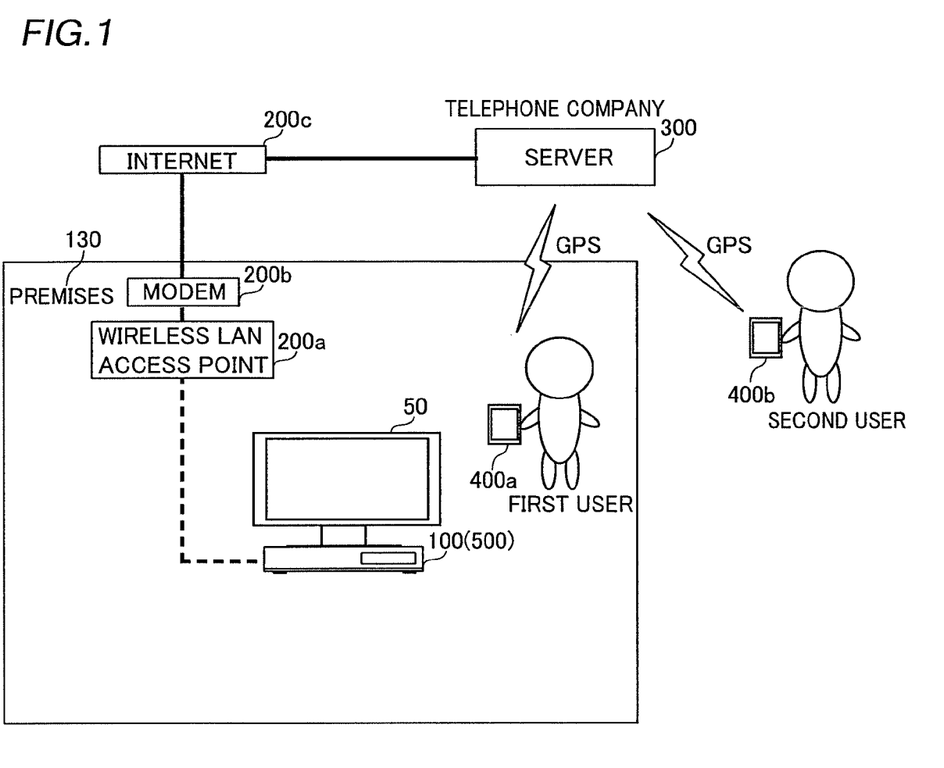
FIG. 1 is a conceptual diagram showing a used state of a BD player according to a first embodiment of the present invention.

The BD player 100 according to the first embodiment of the present invention is configured to be wirelessly connectable to a wireless LAN (local area network) access point 200*a* by a wireless LAN adapter (not shown) connected to a wireless LAN terminal 26 described later, as shown in FIG. 1. The wireless LAN access point 200a is connected to the Internet 200c through a modem 200b. Thus, the BD player 100 can establish bidirectional wireless communication with a server 300 of a telephone company. The positional information of a portable telephone 400a of a first user and a portable telephone 400b of a second user can be acquired by the server 300 of the telephone company with the GPS (global positioning system). The BD player 100 is configured to be capable of acquiring the positional information of the portable telephone 400a of the first user and the portable telephone 400b of the second user acquired by the server 300 of the telephone company through the Internet 200c. The portable telephone 400a is an example of the "portable terminal" or the "positional information acquisition portion" in the present invention. The portable telephone 400b is an example of the "portable terminal" or the "positional information acquisition portion" in the present invention. The server 300 is an example of the "external device" or the "positional information acquisition portion" in the present invention.

Figure 2:
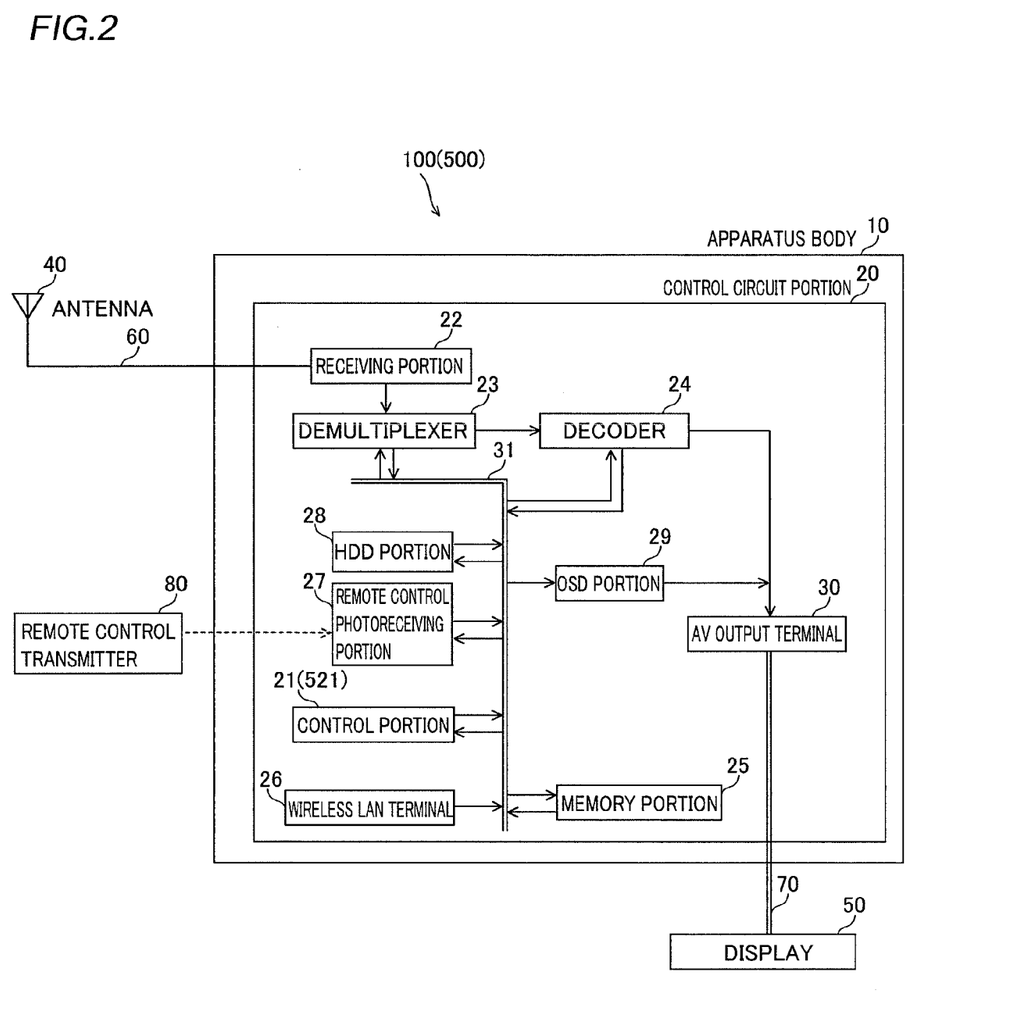
FIG. 2 is a block diagram showing the structure of the BD player according to the first embodiment of the present invention.

The BD player 100 has a control circuit portion 20 of an apparatus body 10 connected to an antenna 40 and a display 50 through an antenna cable 60 and a video and audio cable 70, respectively, as shown in FIG. 2. Thus, a user can view a television program received from a broadcast station through the BD player 100 and record the television program in the BD player 100. The BD player 100 is provided with a remote control transmitter 80 for remote controlling the BD player 100.

The control circuit portion 20 is provided with a control portion 21 controlling the BD player 100, as shown in FIG. 2. The control portion 21 is described in detail later. Furthermore, the control circuit portion 20 is provided with a receiving portion 22 selecting a signal wave of a desired broadcast station from broadcast waves received by the antenna 40 and receiving the signal wave. In addition, the control circuit portion 20 includes a demultiplexer (DEMUX) 23 separating video and audio signals as a broadcast signal and service information (PSI/SI: program specific information/service information) from the signal wave received by the receiving portion 22, a decoder 24 decoding the video and audio signals separated by the demultiplexer 23, and a memory portion 25. The memory portion 25 is an example of the "storage portion" in the present invention.

The control circuit portion 20 further includes the wireless LAN terminal 26 connected with the wireless LAN adapter (not shown), a remote control photoreceiving portion 27 receiving a remote control signal from the remote control transmitter 80, an HDD (hard disk drive) portion 28 recording video and audio data, an OSD (on-screen display) portion 29 performing processing for incorporating video data based on character information and color information instructed to be output by the control portion 21 in received video data output from the display 50, and an AV output terminal 30 constituted by a video output terminal and an audio output terminal, serving as a connection terminal to the display 50, as shown in FIG. 2. The HDD portion 28 is configured to be capable of recording a program based on the broadcast signal received by the receiving portion 22.

The receiving portion 22 (see FIG. 2) is configured to take a digital modulation signal of an arbitrarily selected frequency out of high-frequency digital modulation signals including video and audio data and to have a function of demodulating the selected digital modulation signal and outputting the same. Furthermore, the receiving portion 22 is configured to be capable of receiving information of rating (see FIG. 3) for imposing parental control according to the broadcast signal and the age of the user through a broadcast wave.

The demultiplexer 23 (see FIG. 2) is configured to have a function of separating the signal output from the receiving portion 22 into the video signal, the audio signal, and the service information including the information of rating, supplying the separated video signal and audio signal to the decoder 24, and supplying the service information including the information of rating to the control portion 21 through a bus 31.

The decoder 24 (see FIG. 2) is configured to have a function of decoding the video signal and the audio signal to generate video data and audio data. The video data and the audio data are converted from digital to analog, and thereafter are output from the AV output terminal 30 to the display 50 externally connected to the apparatus body 10.

Figure 3:
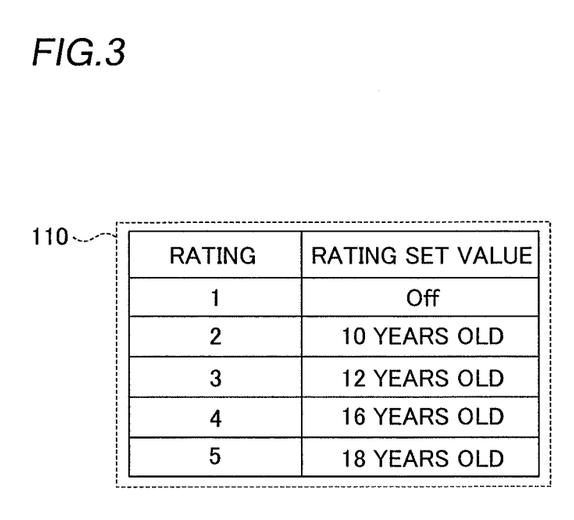
FIG. 3 illustrates a rating correspondence table of the BD player according to the first embodiment of the present invention.

According to the first embodiment, the memory portion 25 (see FIG. 2) stores the information of rating included in the broadcast waves and rating set values in association with each other as a rating correspondence table 110 (see FIG. 3). For example, a rating set value of 10 years old (rating 2) denotes a program for users under 10 years old. In other words, when the rating set value is set to 10 years old, only broadcast signals of broadcast waves including information of rating 2 can be viewed. Parental control is less strict in the order of the rating set value of 10 years old (rating 2), the rating set value of 12 years old (rating 3), the rating set value of 16 years old (rating 4), and the rating set value of 18 years old (rating 5). In other words, parental control on the rating set value of 10 years old (rating 2) is the strictest, and parental control on the rating set value of 18 years old (rating 5) is the least strict. When the rating set value is OFF (rating 1), parental control is in a disabled state.

The memory portion 25 is configured to store the individual parental control of each of a plurality of users to be subject to parental control. Specifically, the memory portion 25 stores a parental control table 120 in which the individual parental control 121 of the first user and the individual parental control 122 of the second user are set to be enabled or disabled for each prescribed time zone in an example shown in FIG. 4. This parental control table 120 can be set by a parent or the like of the users to be subject to parental control. When the individual parental control is "On" in the parental control table 120, the individual parental control is enabled, and when the individual parental control is "Off" in the parental control table 120, the individual parental control is disabled. In the example shown in FIG. 4, the rating set value of 10 years old is set (only programs of the broadcast waves including the information of rating 2 can be viewed) with respect to the first user, and a rating set value of 18 years old is set (only programs of broadcast waves including information of rating 2 to rating 5 can be viewed) with respect to the second user. The control portion 21 is configured to compare a rating set value (see FIG. 3) corresponding to rating included in a broadcast wave with an enable set value to determine whether or not to allow the user to view a program including the rating. The individual parental control is an example of the "parental control" in the present invention. The parental control table 120 is an example of the "parental control information" in the present invention.

The memory portion 25 (see FIG. 2) stores portable telephones owned by the users and the rating set values set for these users in association with each other. For example, in the example shown in FIG. 4, the portable telephone 400a of the first user and the rating set value of 10 years old set for the first user are associated with each other and are stored in the memory portion 25.

Figure 4:
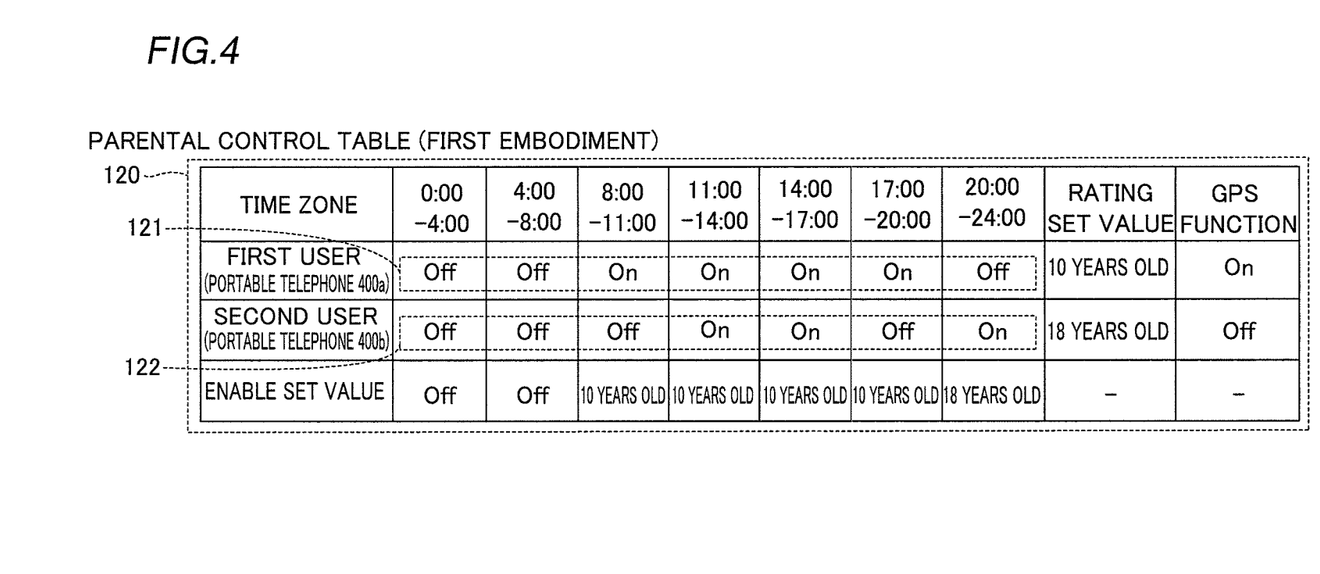
FIG. 4 illustrates a parental control table of the BD player according to the first embodiment of the present invention.
Figure 5:
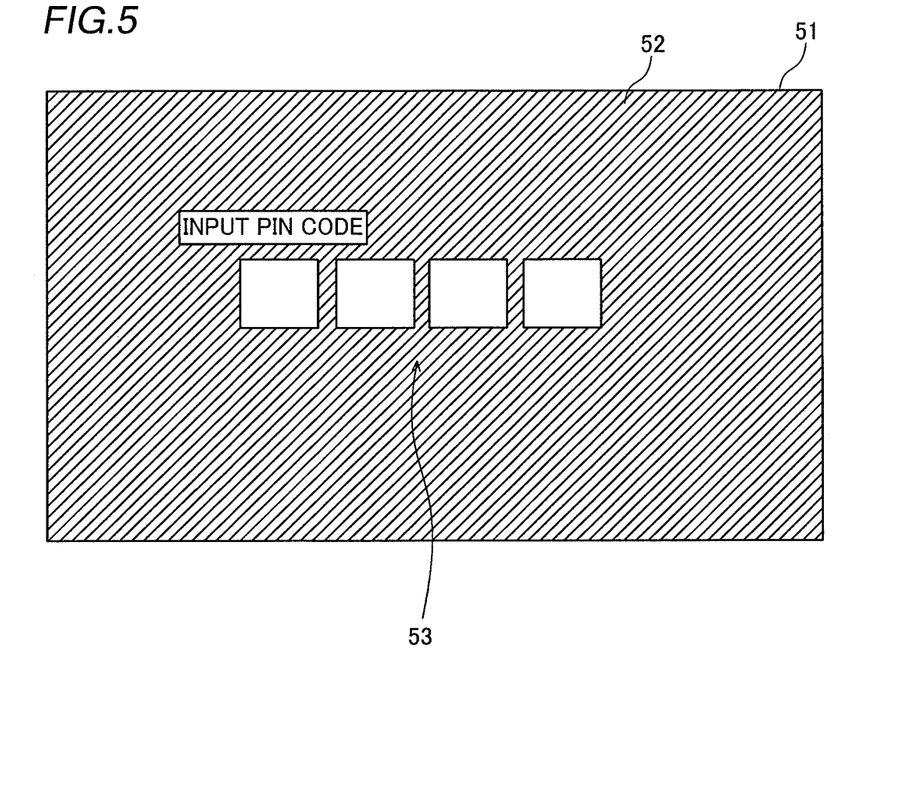
FIG. 5 illustrates a state where parental control of the BD player according to the first embodiment of the present invention is enabled.

The memory portion 25 is configured to store the parental control table 120 in association with the ages of the users to be subject to parental control, as shown in FIG. 4. For example, the memory portion 25 is configured to store the birth date of the first user when 10 years old is stored as the rating set value of the first user. The control portion 21 is configured to perform control of updating the parental control table 120 to correspond to the increased ages when the ages of the users to be subject to parental control are increased. For example, the control portion 21 is configured to perform control of changing the rating set value of the first user from 10 years old to 12 years old when determining that the age of the first user has been increased by 2 years since 10 years old was stored as the rating set value of the first user on the basis of the birth date of the first user stored in the memory portion 25 in the example shown in FIG. 4.

According to the first embodiment, the control portion 21 (see FIG. 2) is configured to determine whether or not (that) a user to be subject to parental control of broadcast signals has entered a prescribed range (premises 130, for example). Specifically, the control portion 21 is configured to determine whether or not at least one of the first user and the second user to be subject to parental control has entered the prescribed range on the basis of the positional information of the users to be subject to parental control acquired by the server 300 with the GPS. More specifically, the control portion 21 is configured to determine whether or not the users to be subject to parental control have entered the prescribed range on the basis of the positional information of the first user and the second user that the server 300 acquires by detecting the portable telephones 400a and 400b each having a GPS function, carried by the first user and the second user to be subject to parental control. Furthermore, the control portion 21 is configured to perform control of enabling the individual parental control corresponding to a user determined to have entered the prescribed range in the case where the individual parental control corresponding to the user determined to have entered the prescribed range is disabled when determining that the user to be subject to parental control has entered the prescribed range. Furthermore, the control portion 21 is configured to perform control of enabling the individual parental control of the parental control table 120 in which parental control is set for each time period in the case where the individual parental control of the parental control table 120 in which parental control is set for each time period is set to be disabled when determining that the user to be subject to parental control has entered the prescribed range. For example, when determining that the first user has entered the prescribed range in a time zone from 0:00 to 4:00, the control portion 21 enables the individual parental control in the time zone from 0:00 to 4:00 of the individual parental control 121 of the parental control table 120 corresponding to the first user. The control portion 21 is an example of the "determination portion" in the present invention. The premises 130 are an example of the "prescribed range" in the present invention.

According to the first embodiment, the control portion 21 is configured to perform control of disabling the enabled individual parental control of the parental control table 120 corresponding to a user determined to have exited the prescribed range when determining that the user to be subject to parental control has exited the prescribed range (the premises 130, for example) after determining that the user to be subject to parental control has entered the prescribed range. For example, in the example shown in FIG. 4, when determining that the first user has exited the prescribed range after determining that the first user has entered the prescribed range in a time zone from 11:00 to 14:00, the control portion 21 disables the enabled individual parental control in the time zone from 11:00 to 14:00 of the individual parental control 121 of the parental control table 120 corresponding to the first user.

According to the first embodiment, the control portion 21 is configured to perform control of enabling the parental control corresponding to the user determined to have entered the prescribed range when determining that the user to be subject to parental control has entered the prescribed range on the basis of the positional information of the user to be subject to parental control. Furthermore, the control portion 21 is configured to be capable of switching between the on-state and off-state of a determination function (the GPS function) for the user to be subject to parental control and perform control of enabling the parental control corresponding to the user determined to have entered the prescribed range when determining that the user to be subject to parental control has entered the prescribed range in the case where the determination function is in the on-state. In addition, the control portion 21 is configured to perform control of acquiring the position (the position of the portable telephone) of the user to be subject to parental control by accessing the server 300 of the telephone company through the wireless LAN adapter (not shown) connected to the wireless LAN terminal 26 when a time zone in the parental control table 120 shifts to a subsequent time zone (the time zone from 0:00 to 4:00 shifts to a time zone from 4:00 to 8:00, for example). The GPS function is an example of the "determination function for the user" in the present invention.

According to the first embodiment, the control portion 21 is configured to perform control of reflecting the individual parental control of a user to be subject to parental control in the prescribed range when determining that some of the plurality of users to be subject to parental control have exited the prescribed range (the premises 130 for example) in the case where the individual parental control of the plurality of users to be subject to parental control is enabled.

According to the first embodiment, the control portion 21 is configured to perform control of enabling the individual parental control in the case where the individual parental control is set to be disabled and reflecting the individual parental control of a user under stricter parental control of the individual parental control set to be enabled, when determining that the users to be subject to parental control have entered the prescribed range (the premises 130, for example). For example, in the example shown in FIG. 4, the control portion 21 enables the individual parental control 121 set to be disabled when determining that the first user has entered the prescribed range in a time zone from 20:00 to 24:00. Then, the control portion 21 reflects the individual parental control of the first user under stricter parental control of the individual parental control 121 of the first user and the individual parental control 122 of the second user in the time zone from 20:00 to 24:00 as the enable set value. In other words, the enable set value in the time zone from 20:00 to 24:00 is changed from 18 years old to 10 years old, and only the program for users under 10 years old (rating 2) (see FIG. 3) can be viewed.

According to the first embodiment, the control portion 21 is configured to perform control of enabling the individual parental control corresponding to the user determined to have entered the prescribed range and starting to record a program, when determining that the user to be subject to parental control has entered the prescribed range in the case where another user views the program. Specifically, the control portion 21 enables the individual parental control thereby starting to record the program from the time point when viewing of the program is restricted (interrupted). In order to prevent the user to be subject to parental control from viewing the restricted program later, a password may be set for recorded data when the program is recorded. In this case, the control portion 21 performs control of setting the viewing prevention password for the recorded program when determining that the user to be subject to parental control has entered the prescribed range in the case where another user views the program based on the broadcast signal and starting to record the program.

According to the first embodiment, the control portion 21 is configured to perform control of displaying a black screen 52 (a shaded area in FIG. 5) on a display portion 51 of the display 50 with the OSD function of the OSD portion 29 in order to allow another user to view the program when parental control is enabled and the program cannot be viewed. Specifically, the control portion 21 is configured to perform control of displaying an indication 53 requesting input of a four-digit PIN (personal identification number) code (a cancel code of parental control) as a cancel number for cancelling a state where the program cannot be viewed on the black screen 52. The PIN code can be previously arbitrarily set by a parent or the like of the user to be subject to parental control.

Figure 6:
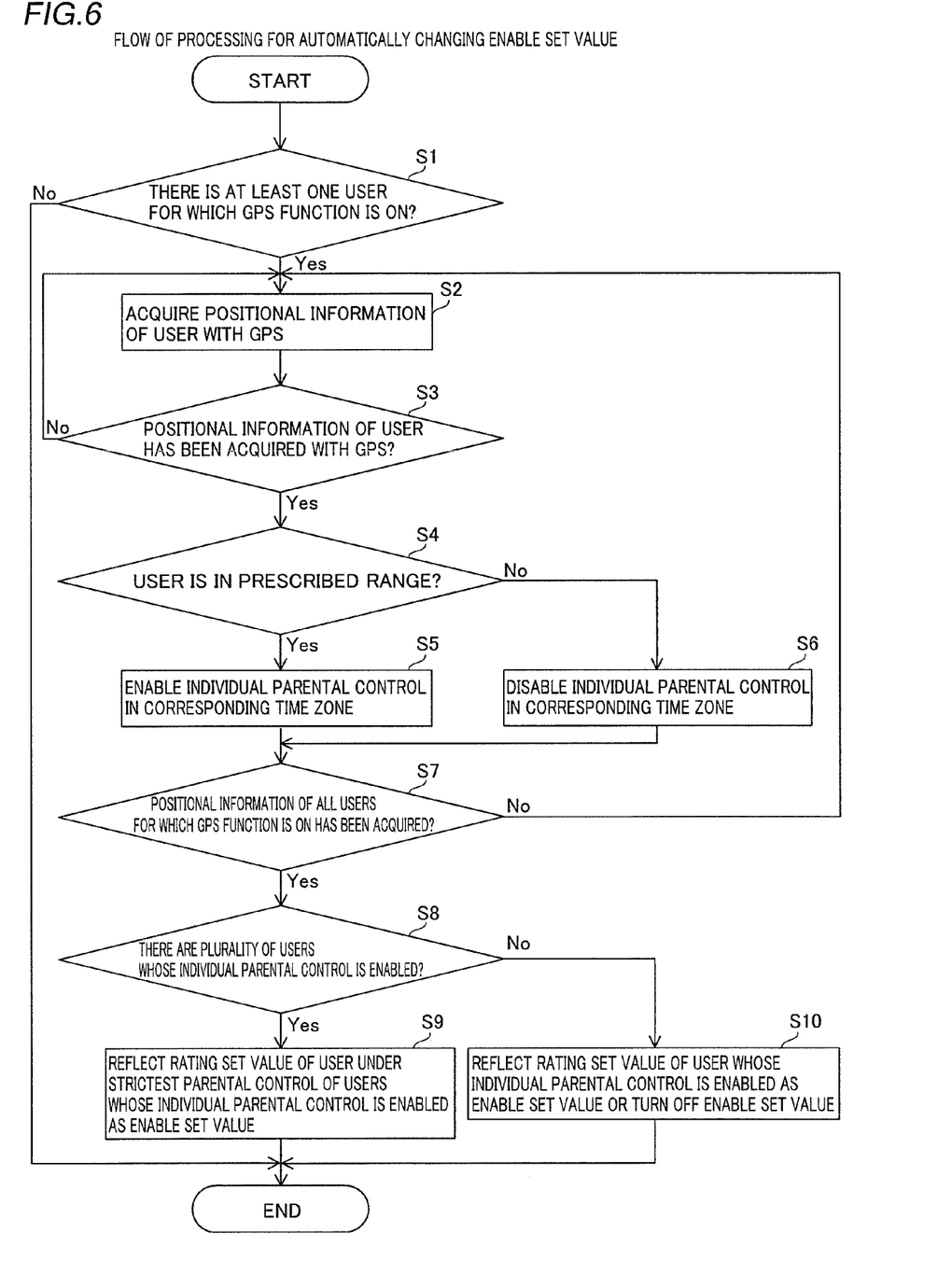
FIG. 6 is a flowchart for illustrating processing for automatically changing an enable set value of the BD player according to the first embodiment of the present invention.

Processing for automatically changing the enable set value performed by the control portion 21 of the ED player 100 according to the first embodiment is now described with reference to FIGS. 4 and 6.

At a step S1, the control portion 21 determines whether or not there is at least one user for which the GPS function is on. When determining that there is at least one user for which the GPS function is on, the control portion 21 advances to a step S2. When determining that there is no user for which the GPS function is on, on the other hand, the control portion 21 terminates the processing for automatically changing the enable set value.

At the step S2, the control portion 21 acquires the positional information of the user with the GPS. At a step S3, the control portion 21 determines whether or not the positional information of the user has been acquired with the GPS. When determining that the positional information of the user has been acquired with the GPS, the control portion 21 advances to a step S4. When determining that the positional information of the user has not been acquired with the GPS, on the other hand, the control portion 21 returns to the step S2.

At the step S4, the control portion 21 determines whether or not the user is in the prescribed range (the premises 130, for example). When determining that the user is in the prescribed range, the control portion 21 advances to a step S5 and enables the individual parental control in a corresponding time zone. When determining that the user is not in the prescribed range, on the other hand, the control portion 21 advances to a step S6 and disables the individual parental control in the corresponding time zone.

At a step S7, the control portion 21 determines whether or not the positional information of all users for which the GPS function is on has been acquired. When determining that the positional information of all the users for which the GPS function is on has not been acquired, the control portion 21 returns to the step S2. When determining that the positional information of all the users for which the GPS function is on has been acquired, on the other hand, the control portion 21 advances to a step S8. At the step S8, the control portion 21 determines whether or not there are a plurality of users whose individual parental control is enabled. When determining that there are the plurality of users whose individual parental control is enabled, the control portion 21 advances to a step S9. When determining that there are not the plurality of users whose individual parental control is enabled (there is one or no user whose individual parental control is enabled), on the other hand, the control portion 21 advances to a step S10.

At the step S9, the control portion 21 reflects the rating set value of a user under the strictest parental control of the users whose individual parental control is enabled as the enable set value (see FIG. 4). Thereafter, the control portion 21 terminates the processing for automatically changing the enable set value.

At the step S10, the control portion 21 reflects the rating set value of the user whose individual parental control is enabled as the enable set value when there is one user whose individual parental control is enabled, and turns off the enable set value when there is no user whose individual parental control is enabled. Thereafter, the control portion 21 terminates the processing for automatically changing the enable set value.

According to the first embodiment, as hereinabove described, the control portion 21 performing control of enabling the parental control corresponding to the user determined to have entered the prescribed range in the case where the parental control corresponding to the user determined to have entered the prescribed range is disabled when determining that the user to be subject to parental control of broadcast signals has entered the premises 130 is provided. Thus, the parental control corresponding to the user determined to have entered the premises 130 automatically becomes enabled when the user to be subject to parental control of broadcast signals has entered the premises 130, and hence parental control can be properly performed without the user's operation.

According to the first embodiment, as hereinabove described, the control portion 21 is configured to perform control of enabling the parental control of the parental control table 120 in which the parental control is set for each time period in the case where the parental control of the parental control table 120 in which the parental control is set for each time period is set to be disabled when determining that the user to be subject to parental control has entered the premises 130. Thus, in the case of employing the parental control table 120, the parental control corresponding to the user determined to have entered the premises 130 automatically becomes enabled even when the user to be subject to parental control has entered the premises 130 in a time zone in which the parental control is set to be disabled, and hence parental control can be easily properly performed without the user's operation also in the case of employing the parental control table 120.

According to the first embodiment, as hereinabove described, the control portion 21 is configured to determine whether or not the user to be subject to parental control has entered the prescribed range on the basis of the positional information of the user to be subject to parental control. Thus, the BD player 100 can accurately determine whether or not the user to be subject to parental control has entered the prescribed range, using the positional information of the user to be subject to parental control.

According to the first embodiment, as hereinabove described, the control portion 21 is configured to determine whether or not the user to be subject to parental control has entered the prescribed range on the basis of the positional information of the user to be subject to parental control acquired by the server 300 with the GPS. Thus, the BD player 100 can more accurately determine whether or not the user to be subject to parental control has entered the prescribed range, using the positional information of the user to be subject to parental control acquired with the GPS.

According to the first embodiment, as hereinabove described, the control portion 21 is configured to determine whether or not the users to be subject to parental control have entered the prescribed range on the basis of the positional information of the users that the server 300 acquires by detecting the portable telephones 400a and 400b each having the GPS function, carried by the users to be subject to parental control. Thus, the BD player 100 can more accurately determine whether or not the users to be subject to parental control have entered the prescribed range, using the positional information of the portable telephones 400a and 400b each having the GPS function, carried by the users.

According to the first embodiment, as hereinabove described, the memory portion 25 storing the individual parental control 121 of the first user to be subject to parental control and the individual parental control 122 of the second user to be subject to parental control is further provided, and the control portion 21 is configured to perform control, of enabling the individual parental control in the case where the individual parental control is set to be disabled and reflecting the individual parental control 121 of the first user under stricter parental control of the individual parental control set to be enabled, when determining that the first user or the second user to be subject to parental control has entered the premises 130. Thus, the individual parental control 121 of the first user (a younger user) under stricter parental control is preferentially reflected, and hence parental control can be properly performed on the first user under stricter parental control.

According to the first embodiment, as hereinabove described, the control portion 21 is configured to perform control of enabling the parental control corresponding to the user determined to have entered the premises 130 and starting to record the program, when determining that the user to be subject to parental control has entered the premises 130 in the case where another user views the program. Thus, when the user to be subject to parental control enters the premises 130, whereby the parental control becomes enabled and viewing of the program is interrupted, the interrupted program starts to be recorded. Therefore, another user not to be subject to parental control can view the interrupted program later while parental control is properly performed on the user to be subject to parental control.

According to the first embodiment, as hereinabove described, the control portion 21 is configured to perform control of setting the viewing prevention password for the recorded program when determining that the user to be subject to parental control has entered the prescribed range in the case where another user views the program based on the broadcast signal and starting to record the program. Thus, the user to be subject to parental control can be inhibited from viewing the program recorded when the user to be subject to parental control has entered the prescribed range.

According to the first embodiment, as hereinabove described, the control portion 21 is configured to perform control of disabling the parental control corresponding to the user determined to have exited the premises 130 when determining that the user to be subject to parental control has exited the premises 130 after determining that the user to be subject to parental control has entered the premises 130. Thus, even in the case where the user to be subject to parental control has entered the premises 130, whereby the parental control has become enabled, the parental control automatically becomes disabled when the user to be subject to parental control exits the premises 130 and the parental control is no longer required. Therefore, unnecessary parental control on another user not to be subject to parental control can be inhibited.

According to the first embodiment, as hereinabove described, the control portion 21 is configured to perform control of enabling the parental control corresponding to the user determined to have entered the premises 130 when determining that the user to be subject to parental control has entered the premises 130 on the basis of the positional information of the user to be subject to parental control. Thus, the BD player 100 can easily determine that the user to be subject to parental control of broadcast signals has entered the premises 130 on the basis of the positional information of the user to be subject to parental control, and hence the parental control corresponding to the user determined to have entered the premises 130 can be easily automatically enabled.

According to the first embodiment, as hereinabove described, the control portion 21 is configured to be capable of switching between the on-state and off-state of the GPS function for the user to be subject to parental control and perform control of enabling the parental control corresponding to the user determined to have entered the premises 130 when determining that the user to be subject to parental control has entered the premises 130 in the case where the GPS function is in the on-state. Thus, whether or not to automatically enable the parental control can be set by switching between the on-state and off-state of the GPS function on the basis of the user's arbitrary setting.

According to the first embodiment, as hereinabove described, the control portion 21 is configured to perform control of cancelling the parental control set to be enabled when the user to be subject to parental control is determined to have entered the prescribed range upon the user's input of the cancel code previously set by the user. Thus, the parental control set to be enabled can be disabled with the cancel code, and hence the convenience can be improved.

According to the first embodiment, as hereinabove described, the control portion 21 is configured to perform control of enabling the parental control corresponding to the user determined to have entered the premises of the user as the prescribed range in the case where the parental control corresponding to the user determined to have entered the premises of the user as the prescribed range is disabled when determining that the user to be subject to parental control has entered the premises. Thus, the parental control can be enabled when the user to be subject to parental control can view the program, and hence parental control can be properly enabled.

According to the first embodiment, as hereinabove described, the parental control table 120 is stored in association with the ages of the users to be subject to parental control, and the control portion 21 is configured to perform control of updating the parental control table 120 to correspond to the increased ages when the ages of the users to be subject to parental control are increased. Thus, the parental control table 120 is automatically set to parental control appropriate for the ages of the users to be subject to parental control, and hence the trouble of updating the parental control can be avoided when the ages of the users are increased.

According to the first embodiment, as hereinabove described, the control portion 21 is configured to determine whether or not the plurality of users to be subject to parental control of broadcast signals have entered the prescribed range by detecting the portable telephones 400a and 400b carried by the plurality of users to be subject to parental control. Thus, the BD player 100 can accurately determine whether or not the users to be subject to parental control have entered the prescribed range, using the positional information of the portable telephones 400a and 400b carried by the plurality of users even when there are the plurality of users to be subject to parental control.

(Second Embodiment)

Figure 7:
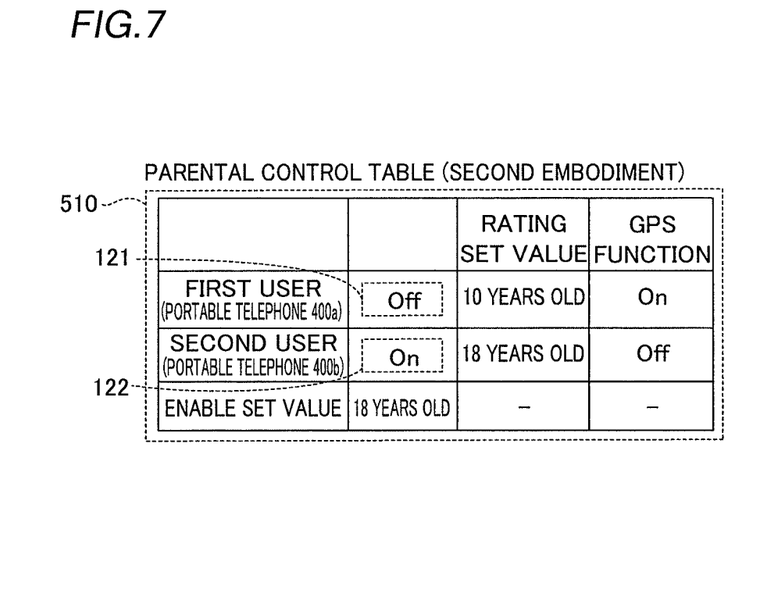
FIG. 7 illustrates a parental control table of a BD player according to a second embodiment of the present invention.

The structure of a BD player 500 according to a second embodiment of the present invention is now described with reference to FIGS. 2 and 7. The BD player 500 is an example of the "broadcasting receiver" in the present invention.

In this second embodiment, an enable set value is set on the basis of a parental control table 510 (see FIG. 7) in which the individual parental control of users is uniformly set for each user regardless of time zones, unlike in the first embodiment in which the enable set value is set on the basis of the parental control table 120 in which the individual parental control of the users is set for each prescribed time zone. The parental control table 510 is an example of the "parental control information" in the present invention.

A control portion 521 (see FIG. 2) of the BD player 500 according to the second embodiment is configured to perform control of enabling the individual parental control of the parental control table 510 when determining that a user to be subject to parental control has entered a prescribed range (premises 130, for example).

The control portion 521 is configured to perform control of acquiring the position (the position of a portable telephone) of the user to be subject to parental control by accessing a server 300 of a telephone company at the prescribed timing (every three hours, for example) set by a user such as a parent through a wireless LAN adapter (not shown) connected to a wireless LAN terminal 26 (see FIG. 2). The frequency of access to the server 300 may be increased in a time zone (late afternoon, for example) in which the user to be subject to parental control is more likely to enter or exit the premises. Alternatively, the history of the positional information of the user to be subject to parental control may be accumulated, and the frequency of access to the server 300 may be increased at the time when the user to be subject to parental control is more likely to enter or exit the premises 130. Thus, the control portion 521 can accurately determine the position of the user to be subject to parental control, and hence the individual parental control corresponding to the user determined to have entered the premises 130 can be accurately automatically enabled.

The remaining structure of the BD player 500 according to the second embodiment is similar to that of the BD player 100 according to the aforementioned first embodiment.

According to, the second embodiment, as hereinabove described, the control portion 521 performing control of enabling the individual parental control corresponding to the user determined to have entered the premises 130 when determining that the user to be subject to parental control of broadcast signals has entered the premises 130 is provided. Thus, the individual parental control corresponding to the user determined to have entered the premises 130 automatically becomes enabled when the user to be subject to parental control of broadcast signals has entered the premises 130, and hence parental control can be properly performed without the user's operation.

The remaining effects of the second embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the present invention is applied to the BD player as the broadcasting receiver in each of the aforementioned first and second embodiments, the present invention is not restricted to this. The present invention is also applicable to another broadcasting receiver such as a television apparatus or an STB (settop box), for example.

While the individual parental control (the parental control) becomes enabled when it is determined that the user to be subject to parental control has entered the premises 130 (the prescribed range) in each of the aforementioned first and second embodiments, the present invention is not restricted to this. According to the present invention, the parental control may alternatively become enabled when it is determined that the user to be subject to parental control has enter an area within 10 m from the broadcasting receiver, for example, as the prescribed range.

While whether or not the two first and second users as the users to be subject to parental control have entered the premises 130 (the prescribed range) is determined and the individual parental control 121 and the individual parental control 122 (the parental control) become enabled in each of the aforementioned first and second embodiments, the present invention is not restricted to this. According to the present invention, whether or not one or more than two users have entered the prescribed range may alternatively be determined, and the parental control may alternatively become enabled.

While whether or not the user to be subject to parental control has entered the premises 130 (the prescribed range) is determined on the basis of the positional information of the user in each of the aforementioned first and second embodiments, the present invention is not restricted to this. According to the present invention, whether or not the user to be subject to parental control has entered the prescribed range may alternatively be determined on the basis of personal identification information other than the positional information of the user, for example. For example, whether or not the user to be subject to parental control has entered the prescribed range may be determined on the basis of image information of the user's face or sound information of the user's voice as the personal identification information. Specifically, the broadcasting receiver may be configured to be capable of acquiring the image information of the user's face imaged by an intercom of the premises of the user and determine whether or not the user has entered the prescribed range by comparing the acquired image information of the face with image information of the face of the user to be subject to parental control previously registered in the broadcasting receiver. Alternatively, the broadcasting receiver may be configured to be capable of acquiring the sound information of the user's voice by a microphone provided on the broadcasting receiver and determine whether or not the user has entered the prescribed range by comparing the acquired sound information of the voice with sound information of the voice of the user to be subject to parental control previously registered in the broadcasting receiver.

While the BD player (the broadcasting receiver) detects the positional information of the user with the GPS function (the determination function for the user) in each of the aforementioned first and second embodiments, the present invention is not restricted to this. According to the present invention, the broadcasting receiver may detect the positional information of the user by using the portable telephone as a remote controller for remotely operating the broadcasting receiver with a determination function for the user other than the GPS function, for example.

While the parental control becomes enabled on the basis of the information of rating included in the broadcast waves in each of the aforementioned first and second embodiments, the present invention is not restricted to this. According to the present invention, parental control of a pay program may alternatively become enabled on the basis of information indicating that it is a pay program, included in the broadcast wave of the pay program, or parental control of a program to be charged may alternatively become enabled on the basis of information indicating that it is a program to be charged, included in the broadcast wave of the program to be charged, for example. Furthermore, parental control of a specific channel may alternatively become enabled on the basis of information indicating that it is a specific channel, included in the broadcast wave of the specific channel.

While the individual parental control (the parental control) of the user is set to be enabled or disabled for each prescribed time zone in the aforementioned first embodiment, the present invention is not restricted to this. According to the present invention, the individual parental control (the parental control) of the user may alternatively be set to be enabled or disabled for each day of the week, each weekday or holiday, each long vacation such as summer vacation, or the like, for example.

While the program is recorded in the HDD portion provided inside the BD player (the broadcasting receiver) in each of the aforementioned first and second embodiments, the present invention is not restricted to this. According to the present invention, the program may alternatively be recorded in an HDD portion provided outside the broadcasting receiver.

While the processing performed by the control portion according to the present invention is described, using the flowchart described in a flow-driven manner in which processing is performed in order along a processing flow for the convenience of illustration in each of the aforementioned first and second embodiments, the present invention is not restricted to this. According to the present invention, the processing performed by the control portion may alternatively be performed in an event-driven manner in which processing is performed on an event basis. In this case, the processing performed by the control portion may be performed in a complete event-driven manner or in a combination of an event-driven manner and a flow-driven manner.

What is claimed is:

1. A broadcasting receiver comprising:
    a receiving portion receiving a broadcast signal;
    a determination portion deciding whether or not a user to be subject to parental control of the broadcast signal has entered a prescribed range; and
    a control portion enabling parental control corresponding to a user determined to have entered the prescribed range in a case where the parental control corresponding to the user determined to have entered the prescribed range is disabled when the determination portion decides that the user to be subject to parental control has entered the prescribed range; wherein:
    the determination portion decides whether or not the user to be subject to parental control has entered the prescribed range on the basis of positional information of the user to be subject to parental control acquired by an external device with GPS,
    the control portion enables the parental control of parental control information in which the parental control is set for each time period, in a case where the parental control is set to be disabled when the determination portion decides that the user to be subject to parental control has entered the prescribed range,
    the control portion is capable of switching between an on-state and an off-state of GPS and enables the parental control of parental control information in which the parental control is set for each time period, in a case where the parental control is set to be disabled and GPS is set to be the on-state when the determination portion decides that the user to be subject to parental control has entered the prescribed range, and
    the parental control is settable to be enabled or disabled for each time period and for each user.

2. The broadcasting receiver according to claim 1, wherein the determination portion decides whether or not the user to be subject to parental control has entered the prescribed range on the basis of the positional information of the user to be subject to parental control that the external device acquires by detecting a portable terminal having a GPS function, carried by the user to be subject to parental control.

3. The broadcasting receiver according to claim 2, wherein the determination portion decides whether or not a plurality of users to be subject to parental control of the broadcast signal have entered the prescribed range on the basis of positional information of the plurality of users to be subject to parental control that the external device acquires by detecting portable terminals carried by the plurality of users to be subject to parental control.

4. The broadcasting receiver according to claim 1, further comprising a storage portion storing individual parental control of each of a plurality of users to be subject to parental control, wherein
    the control portion enables the individual parental control in a case where the individual parental control is set to be disabled and reflects individual parental control of a user under stricter parental control of the individual parental control set to be enabled, when the determination portion decides that the user to be subject to parental control has entered the prescribed range.

5. The broadcasting receiver according to claim 1, wherein the control portion enables the parental control corresponding to the user determined to have entered the prescribed range and starts to record a program based on the broadcast signal, when the determination portion decides that the user to be subject to parental control has entered the prescribed range in a case where another user views the program.

6. The broadcasting receiver according to claim 5, wherein the control portion sets a viewing prevention password for the program to be recorded when the determination portion decides that the user to be subject to parental control has entered the prescribed range in the case where another user views the program based on the broadcast signal and the program starts to be recorded.

7. The broadcasting receiver according to claim 1, wherein the control portion disables parental control corresponding to a user determined to have exited the prescribed range when the determination portion decides that the user to be subject to parental control has exited the prescribed range after determining that the user to be subject to parental control has entered the prescribed range.

8. The broadcasting receiver according to claim 1, wherein the control portion enables the parental control corresponding to the user determined to have entered the prescribed range when the determination portion decides that the user to be subject to parental control has entered the prescribed range on the basis of positional information or personal identification information of the user to be subject to parental control.

9. The broadcasting receiver according to claim 1, wherein
the control portion is capable of switching between an on-state and an off-state of a determination function for the user to be subject to parental control and enables the parental control corresponding to the user determined to have entered the prescribed range when the determination portion decides that the user to be subject to parental control has entered the prescribed range in a case where the determination function is in the on-state.

10. The broadcasting receiver according to claim 1, wherein
the control portion cancels the parental control set to be enabled when the determination portion decides that the user to be subject to parental control has entered the prescribed range upon a user's input of a cancel code previously set by another user.

11. The broadcasting receiver according to claim 1, wherein
the control portion enables parental control corresponding to a user determined to have entered premises of the user as the prescribed range in a case where the parental control corresponding to the user determined to have entered the premises of the user as the prescribed range is disabled when the determination portion decides that the user to be subject to parental control has entered the premises.

12. The broadcasting receiver according to claim 1, wherein
the parental control information is stored in association with an age of the user to be subject to parental control, and
the control portion updates the parental control information to correspond to an increased age when the age of the user to be subject to parental control is increased.

13. A parental control system comprising:
a positional information acquisition portion acquiring positional information of a user; and
a broadcasting receiver including a receiving portion receiving a broadcast signal, a determination portion deciding whether or not a user to be subject to parental control of the broadcast signal has entered a prescribed range on the basis of the positional information of the user acquired by the positional information acquisition portion, and a control portion, wherein
the control portion enables parental control corresponding to a user determined to have entered the prescribed range in a case where the parental control corresponding to the user determined to have entered the prescribed range is disabled when the determination portion decides that the user to be subject to the parental control has entered the prescribed range.
the determination portion decides whether or not the user to be subject to parental control has entered the prescribed range on the basis of the positional information of the user to be subject to parental control acquired by an external device with GPS,
the control portion is capable of switching between an on-state and an off-state of GPS and enables the parental control of parental control information in which the parental control is set for each time period, in a case where the parental control is set to be disabled and GPS is set to be the on-state when the determination portion decides that the user to be subject to parental control has entered the prescribed range, and
the parental control is settable to be enabled or disabled for each time period and for each user.

14. The parental control system according to claim 13, further comprising a storage portion storing individual parental control of each of a plurality of users to be subject to parental control, wherein
the control portion enables the individual parental control in a case where the individual parental control is set to be disabled and reflects individual parental control of a user under stricter parental control of the individual parental control set to be enabled, when the determination portion decides that the user to be subject to parental control has entered the prescribed range.

* * * * *